Patented Sept. 1, 1931

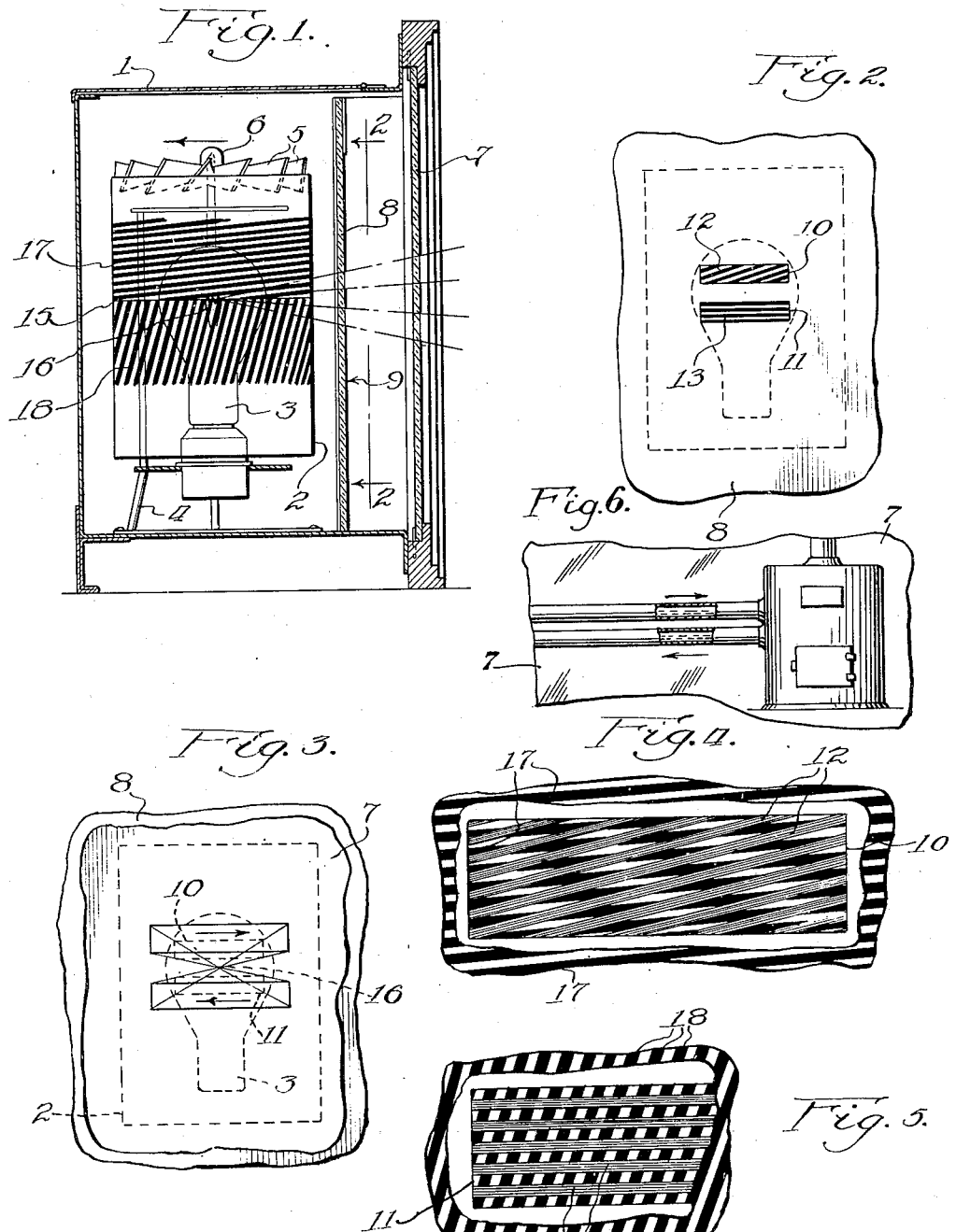

1,821,557

UNITED STATES PATENT OFFICE

AUBREY B. LEECH, OF LOS ANGELES, CALIFORNIA

APPARATUS FOR PRODUCING MOTION PICTURE EFFECTS

Application filed November 12, 1927. Serial No. 232,878.

This invention relates to apparatus for producing motion picture effects particularly adapted for advertising signs.

The main object of this invention is to produce an illusion of horizontal motion travelling in opposite directions, using a single movable screen and a single source of light.

An illustrative embodiment of this invention is shown in the accompanying drawings, in which:—

Figure 1 is a vertical transverse section of an advertising sign with the movable screen thereof being shown in elevation.

Fig. 2 is a front elevation of a fragmentary medial portion of the intermediate screen taken on the line 2—2 of Fig. 1.

Fig. 3 is a front elevation of a fragmentary portion of the object screen showing diagrammatically the arrangement of projection from the sources of light to the object screen.

Fig. 4 is an enlarged fragmentary detail showing the inclined lines of the intermediate screen super-imposed on the lines of the movable screen, showing how the illusion of motion in a direction opposite to the direction of movement of the movable screen is created.

Fig. 5 is a similar view showing the lines which create the illusion of motion in the same direction as the direction of travel of the movable screen.

Fig. 6 is a fragmentary elevation of an object screen, showing a picture.

Heretofore in the construction of this type of motion picture advertising sign, in order to secure the illusion of motion travelling in opposite horizontal directions, it has been necessary to provide either a single moving screen with a plurality of sources of light behind it or a plurality of movable screens, each having a separate source of light. In the present invention, the illusion of motion travelling both to the right and to the left in horizontal direction, when viewed from the front, is produced with a single movable screen having a single source of light.

This invention is of the same general class as that shown in my U. S. Patent No. 1,369,751, dated February 22, 1921, in which a rectangular box-like structure 1 is provided with a cylindrical screen 2 surrounding a light bulb 3 mounted on a supporting framework 4. The top end of the cylindrical screen 2 is attached to a plurality of inclined vanes 5 supported on a hub 6 which is pivotally mounted on a pointed rod 17 carried by the framework 4.

An object screen 7 is adapted to have various scenes painted thereon, portions of which depict objects in motion. Screen 7 is preferably made of glass and when in use has portions thereof transparent, other portions opaque, and other portions translucent.

An intermediate screen 8 is interposed between the object screen 7 and the cylindrical screen 2, and for the purposes of illustration in this instance is shown with the surface thereof covered with an opaque or translucent frosting 9, with the exception of two horizontally disposed rectangular-shaped portions 10 and 11.

The portion 10 is provided with a plurality of inclined lines 12 which are disposed at an acute angle with respect to the horizontal and the upward trend thereof being in a direction opposite to the direction of travel of the cylindrical screen 2.

The portion 11 of the screen 8 is shown for illustration as having a plurality of horizontal lines 13 thereon and the spaces 10 and 11 are both preferably equally spaced vertically from the center line 15 on the cylindrical screen which is in horizontal alinement with the filament 16 of the light bulb 3.

That portion of the cylindrical screen 2 above the line 15 is provided with a plurality of lines 17 inclined at an acute angle with respect to the horizontal and having a lesser angle than the lines 12 on the intermediate screen. That portion of the screen below the line 15 is shown for the purposes of illustration as being provided with a plurality of nearly vertically disposed lines 18.

All of the lines on both the movable screen 2 and the intermediate screen 8 and the remaining portions of both screens have different degrees of permeability to light rays. In some instances opaque lines are painted on a transparent background. In other instances translucent lines are painted on a transparent background and in other cases an opaque background is provided with transparent or translucent lines. Different combinations with different degrees of permeability to light rays produce different effects or illusions on the object screen.

In the operation of this apparatus the screen 2 is rotated in the manner described in my heretofore mentioned patent; that is, by the current of air created by the heat of the light bulb striking against the inclined vanes 5. When the cylinder 2 is rotated in the direction of the arrow shown in Fig. 1, the inclined lines 17 throw shadows through the spaces between the lines 12 on the intermediate screen, which shadows begin at the lower ends of the lines and travel upward and to the right. Due to the flatish angle of the lines 12, the illusion of motion travelling in a direction opposite to the direction of movement of the cylinder 2 is produced.

When the screen 2 is rotated, the lines 18 pass along the horizontal lines 13 in the usual manner and create the illusion of motion travelling in the same direction as the direction of travel of the screen.

Although but one specific embodiment of this invention has been herein shown and described, it will be understood that details of the construction shown may be altered or omitted without departing from the spirit of this invention as defined by the following claims.

I claim:

1. In an apparatus for producing motion picture effects, an object screen, a picture on said object screen, a source of light, a movable screen located between said source of light and said object screen, an intermediate screen located between said movable screen and said object screen, lines on said intermediate screen inclined at an angle with respect to the horizontal, and in a direction opposite to the direction of movement of said movable screen, and lines on said movable screen inclined in the same direction as the lines on said intermediate screen but having a lesser angle with respect to the horizontal so as to produce the illusion of motion travelling in a direction opposite to the direction of movement of said movable screen.

2. In an apparatus to produce motion picture effects, an object screen, a picture on said object screen, a source of light, a pair of intermediate screens located between said source of light and said object screen, one of said intermediate screens being movable, lines on each of said intermediate screens inclined at different angles with respect to the horizontal, and in a direction opposite to the direction of movement of said movable screen so as to produce the illusion of motion travelling in a direction opposite to the direction of movement of said movable screen, and other lines on said intermediate screens arranged to produce the illusion of motion travelling in the same direction as the direction of movement of said movable screen.

3. In an apparatus to produce motion picture effects, an object screen, a picture on said object screen, a source of light, a cylindrical screen surrounding said source of light, means for rotating said screen, a stationary intermediate screen located between said cylindrical screen and said object screen, lines on said cylindrical screen and said intermediate screen inclined at different angles with respect to the horizontal, and in a direction opposite to the direction of movement of said movable screen, the lines on said intermediate screen being of slightly greater angle than the lines on said cylindrical screen, so as to produce the illusion of motion travelling in a direction of motion opposite to the direction of movement of said cylindrical screen and other lines on said cylindrical and intermediate screens arranged to produce the illusion of motion travelling in the same direction as the direction of movement of said cylindrical screen, each of said sets of lines being positioned with respect to the filament of said source of light, so as to be projected on said object screen in spaced horizontal alinement on the object screen.

4. In an apparatus to produce motion picture effects, an object screen, a picture on said object screen having spaced transparent portions, a source of light, a movable screen disposed between said source of light and said object screen comprising sections each having lines of different inclinations thereon, and intermediate screen having a pair of spaced transparent sections therein each in registration with one of the lined sections of the movable screen, and image forming means on the transparent sections of said intermediate screen arranged for casting images on said object screen in superimposed relation to the images formed by the lines of the registering lined sections of the movable screen to produce illusions of motion in the opposite direction.

5. In an apparatus of the class described a casing having an object screen therein, a source of light in said casing, an intermediate screen in said casing having transparent portions therein, means on each of said transparent portions each comprising lines of different inclinations for casting spaced images on the object screen, and a movable screen between said source of light and said intermediate screen having upper and lower line portions for casting images on the object in superimposed relation to the images formed by the upper and lower series of lines respectively on the intermediate screen for producing an illusion of motion in one direction in spaced relation to an illusion of motion in a different direction.

6. In a device of the character described, a front screen, having a picture thereon, a lamp back of said screen and a plurality of screens composed of light transmitting material interposed between said lamp and said front screen, one of the intermediate screens being movable continuously in one direction and another being stationary, said movable screen having inclined relatively opaque lines to express various speeds and directions vertically, and said stationary screen having a translucent face with relatively transparent lines variously inclined to produce corresponding effects as to speed and direction horizontally, whereby various composite speed and direction effects are produced on different parts of said front screen.

Signed at Los Angeles this 12th day of October 1927.

AUBREY B. LEECH.